(12) United States Patent
Keyes

(10) Patent No.: US 6,978,807 B1
(45) Date of Patent: Dec. 27, 2005

(54) WATER STOP FOR A LINE INSTALLATION IN A PRE-INSULATED PIPELINE

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 0 days.

(21) Appl. No.: 11/090,649

(22) Filed: Mar. 25, 2005

(51) Int. Cl.$^7$ ................................................. F16L 59/14
(52) U.S. Cl. ...................... 138/149; 138/148; 138/113; 138/112; 285/47
(58) Field of Search .................... 138/114, 113, 112, 138/148, 149; 285/47

(56) References Cited

U.S. PATENT DOCUMENTS

| | | | | |
|---|---|---|---|---|
| 2,696,835 A | * | 12/1954 | Kaiser | .......................... 138/101 |
| 3,068,026 A | * | 12/1962 | McKamey | .................... 285/47 |
| 3,511,282 A | * | 5/1970 | William et al. | ............. 138/113 |
| 3,574,357 A | * | 4/1971 | Alexandru et al. | ........... 285/47 |
| 3,654,691 A | * | 4/1972 | Willhite et al. | ............. 228/155 |
| 4,025,091 A | * | 5/1977 | Zeile, Jr. | ....................... 285/53 |
| 4,130,301 A | * | 12/1978 | Dunham et al. | .............. 285/47 |
| 4,162,093 A | * | 7/1979 | Sigmund | ....................... 285/47 |
| 4,332,401 A | * | 6/1982 | Stephenson et al. | .......... 285/47 |
| 4,340,245 A | * | 7/1982 | Stalder | ......................... 285/53 |
| 4,415,184 A | * | 11/1983 | Stephenson et al. | .......... 285/47 |
| 6,142,359 A | * | 11/2000 | Corbishley et al. | ......... 228/104 |
| 6,216,745 B1 | * | 4/2001 | Augustynowicz et al. | .. 138/149 |

* cited by examiner

Primary Examiner—Patrick Brinson
(74) Attorney, Agent, or Firm—Charles D. Gunter, Jr.

(57) ABSTRACT

A high temperature pre-insulated piping system is shown which has a special water stop located along the length of the piping. The water stop has an internal disk which forms a pair of isolated regions within the water stop. The internal disk is formed of a material which is impervious to the flow of water. As a result, the two internal regions are isolated from one another and act as isolating elements to contain any breach in the exterior of the piping system to a specific location in the length of the pipe string.

9 Claims, 2 Drawing Sheets

WATER STOP FOR A LINE INSTALLATION IN A PRE-INSULATED PIPELINE

CROSS REFERENCE TO RELATED APPLICATIONS:

The present application is related to the copending application of Thomas Joseph Keyes entitled "Water Stop For a Loop Installation In a Pre-Insulated Pipeline," Ser. No. 11/090,431, filed concurrently herewith.

BACKGROUND OF THE INVENTION

1. Field of the Invention:

The present invention relates to pre-insulated piping systems, and more specifically to a method for isolating a section of piping in the case of a breakdown of the insulation in the presence of water or other contaminants or under thermal movement stresses.

2. Description of the Prior Art:

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominately two types of piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. The present application is directed toward the "bonded" foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pie and outer carrier pipe in the class-A type system.

Various factors can affect the integrity of the bonded foam type pre-insulated piping system. For example, environmental factors which may adversely affect the integrity of the insulated system include floods, high water tables, cooling and condensation, and the like. The protective jacket of the insulated pipeline may also be punctured inadvertently by maintenance or construction operations, as where another utility line is being installed in the immediate vicinity. If the outer protective jacket is penetrated for any reason, ground water and water vapor may enter the piping system. This leads to corrosion of the inner steel pipe and may result in ultimate failure of the system.

Steps can be taken in an attempt to prevent external intrusion into the protective jacket of the insulated pipeline. For example, in the case of adjacent utility work, above ground markers, surveying tools, and the like can be used to help avoid contact with the underground insulated pipeline.

Despite attempts to prevent damage of the above type, there continues to exist a need for a system for isolating a section of pre-insulated piping in the case of a breakdown in the integrity of the outer protective jacket.

There continues to exist a need for such a system which would absolutely insure that water which penetrated the outerjacket was prevented from traveling down the pipeline past a predetermined stop point.

SUMMARY OF THE INVENTION

The present invention has as its general purpose to provide a system for effectively isolating a section of pre-insulated piping in the case of failure of the protective outer jacket at some point along the length of the pipeline which system satisfies the previously described deficiencies.

This object is accomplished by providing an underground piping system capable of servicing temperatures in excess of 212° F. in which a metal carrier pipe is insulated by a surrounding layer of foam insulation. A first and second length of insulated and jacketed pipe are provided, each having a joining end to be joined to an end of the other length. Each of the pipe lengths comprises an inner metal pipe having an interior surface and an exterior surface. An envelope of foamed insulation is applied so that it surrounds the inner pipe exterior surface. An outer protective HDPE jacket surrounds the envelope of insulation. The joining ends of adjacent pipe lengths are affixed, as by being welded together, to form fixed joints, whereby the adjacent pipe lengths provide a continuous fluid conduit for conveying high temperature fluids.

A special water stop is installed at one or more selected points in the overall length of the piping system. While the water stop can be installed at an elbow or loop location provided in the line installation, it can also be installed at any other convenient line location, for example, in a straight run of the piping system. The water stop comprises a centrally located disk which surrounds the inner carrier pipe at a selected location and which extends radially outwards generally perpendicular to the pipe in a direction toward the outer jacket. The centrally located disk is formed of a material which is impervious to the passage of water so that it forms a water stop.

Preferably, the centrally located disk is formed of a suitable non-heat conductive synthetic, such as a suitable ceramic material, which resists the transfer of heat from the inner carrier pipe outward toward the protective jacket. The disk can be fixed to the inner carrier pipe, for example by a suitable epoxy, or can merely be slipped over the pipe so that a central opening in the disk is in close frictional engagement with the pipe where machining tolerances allow. The central opening in the disk can be backed up with a suitable silicone material to further insure against leakage. The centrally located disk is positioned to form a first and second internal regions along the length of the piping so that intrusion of water into one of the regions will not be communicated to the other respective region. Preferably, the lengths of insulated piping are part of a pipeline conveying steam, hot water or other hot fluids at a temperature of about 212° F. or above.

Additional objects, features and advantages will be apparent in the written description which follows.

DETAILED DESCRIPTION OF THE INVENTION

Figure 1:
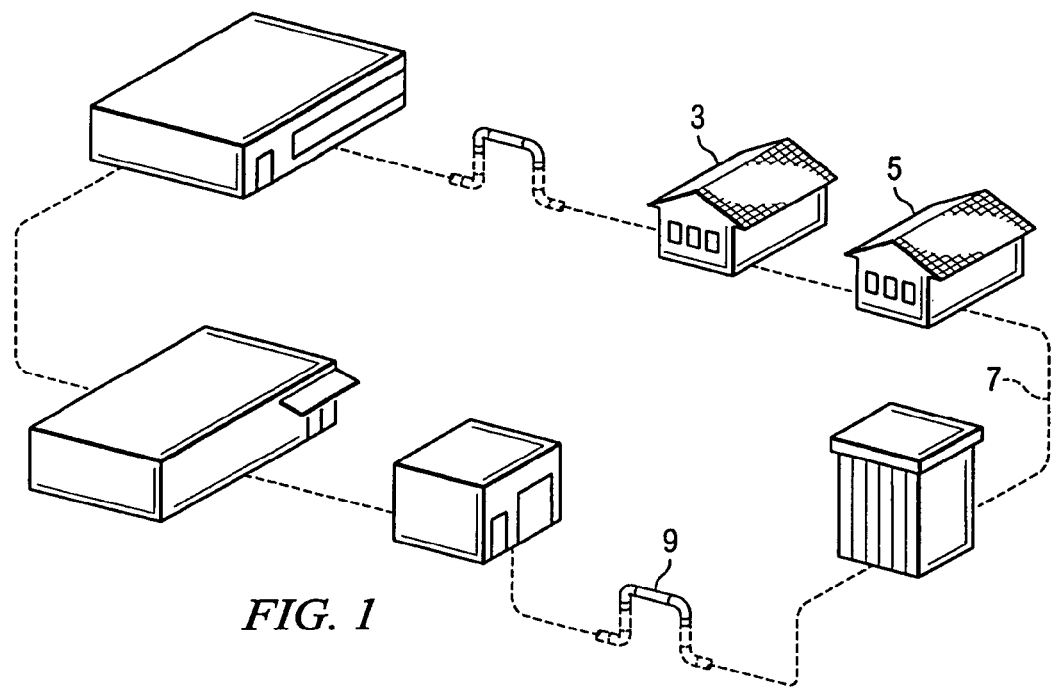
FIG. 1 is a simplified representation of a typical distributed piping system of the type under consideration utilizing hot water or steam for heating.
Figure 2:
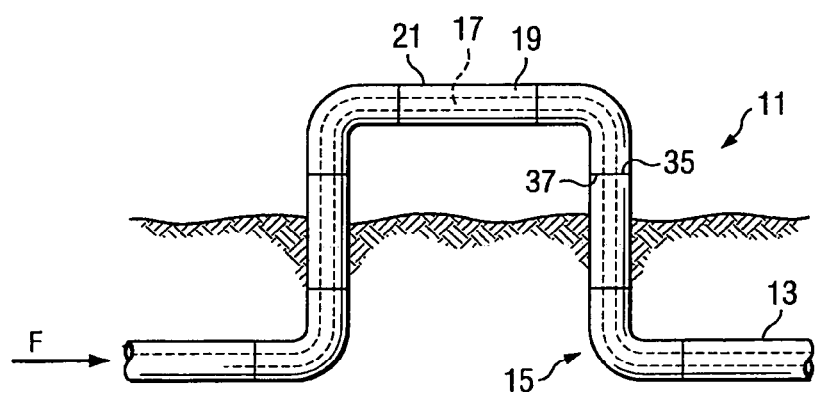
FIG. 2 is a schematic representation of an expansion loop in a pre-insulated pipeline prior to thermal expansion.

Turning first to FIGS. 1–2, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9.

FIG. 2 is a schematic view of the standard piping installation of the type under consideration designated generally as 11. The installation 11 includes a number of coaxially oriented lengths of pipe, such as length 13 (shown broken away in FIG. 2). The installation may also include a number of angled fittings such as the right angle elbows (generally shown as 15) in FIG. 2. Each length of pipe includes an inner pipe 17, typically formed of steel, an envelope of foamed insulation 19 surrounding the inner pipe and outer protective jacket 21 surrounding the envelope of insulation. The joining ends (shown generally as 35, 37 in FIG. 2) of adjacent pipe lengths are affixed, as by being welded together, to form fixed joints, whereby the adjacent pipe lengths provide a continuous fluid conduit for conveying high temperature fluids. The jacket 21 in FIG. 2 is typically formed of high density polyethylene (HDPE) or a similar polyolefin type material. The following references, among others, teach the manufacture of such prior art systems: U.S. Pat. No. 3,793, 4111; U.S. Pat. No. 4,084,842; and U.S. Pat. No. 4,221,405, all to Stonitsch et al.; as well as U.S. Pat. No. 6,547,908 and U.S. Pat. No. 5,736,715, both assigned to Thermacor Process, Inc., the assignee of the present invention.

While the above described systems are commonly used in underground piping systems today, other systems are known which utilize simple enclosed air spaces and also other insulating materials such as mineral wool, fiber glass batting, and the like, to provide the required degree of insulation. Whatever the choice of insulating materials, various environmental factors can act to affect the integrity of such systems. For example, a manufacturing defect or an installation defect can compromise the integrity of the system. Similarly, at a later date, the outer protective jacket can be cut or damaged due to maintenance crews installing additional underground utilities. If the outer protective jacket is compromised for any reason, ground water can attack the foam and ultimately the inner steel carrier pipe. The water stop of the invention is intended to prevent or limit damage of the above type which might be caused by the penetration of the outer protective jacket of the piping system.

Figure 3:
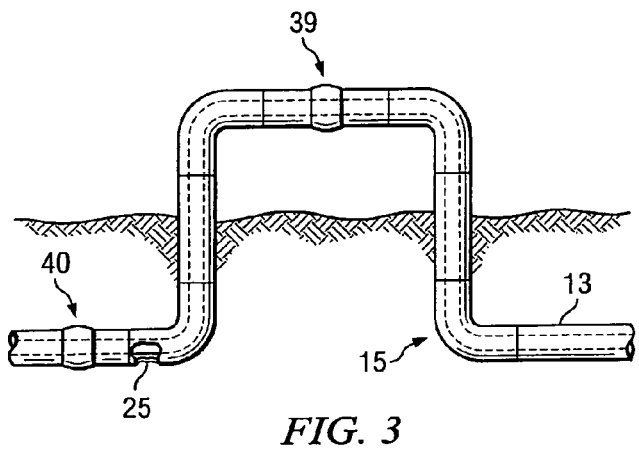
FIG. 3 is an isolated view of a loop similar to the loop of FIG. 2, but with the water stop of the invention installed.

The present invention is directed toward a method for isolating a section of piping in a piping system of the type shown in FIGS. 1–3 where a problem has occurred and the integrity of the pipe insulation has been breached at one or more locations along the overall length of the pipeline. For example, the system could be used to isolate the breach illustrated as 25 in FIG. 3 from sections of the pipeline upstream or downstream of the breached location.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350° F. and higher will be encountered. The expected operating temperature of the pipeline will determine the type of outer foam insulation utilized. For example, 250° F. is the present temperature limitation at which polyurethane foam is used in bonded foam systems. Temperatures above 250° F. require the use of higher temperature foams, such as polyisocyanurate foam.

The present invention is an add-on improvement to presently available pre-insulated bonded foam piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

| | |
|---|---|
| Carrier Pipe- | |
| diameter less than about 2" | A53 ERW Grade B, Std. Wt. Black Steel |
| diameter greater than about 2" | A106 SML, Std. Wt. Black Steel |
| HDPE Jacket- | |
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |
| Polyisocyanurate Insulation- | |
| Density | >2.4 lbs/ft$^3$ |
| "K" Factor | ≦0.14 @ 70° F.,≦0.24 @ 406° F. |
| Compressive Strength | >30 psi |
| Closed Cell Content | ≧90% |
| Minimum Thickness | ≧2.5" @ 366° F., ≧3.0" @ 406° F. |

The present invention preferably incorporates a water stop, such as the stops 39 and 40 in FIG. 3, into the insulated piping system 13 for conveying high temperature fluids, as previously discussed. The piping system shown in FIG. 3, again incorporates a first and second length of insulated and jacketed pipe, each having a joining end to be joined to and end of the other length, as discussed with respect to FIG. 2. Each pipe length comprises an inner carrier pipe having an interior surface and an exterior surface. An envelope of foamed insulation surrounds the inner pipe exterior surface. An outer protective jacket surrounds the envelope of insulation. The joining ends of adjacent pipe lengths are typically welded together to form fixed joints, whereby the adjacent pipe lengths provide a continuous length of fluid conduit for conveying high temperature fluids.

The pipeline shown in FIG. 3 is thus identical to the previously described piping system illustrated in FIGS. 1 and 2 with the exception of the water stops 39, 40 which are inserted at selected locations within the length of the piping system. The water stops 39,40 can be installed at an elbow or other change of direction location, as illustrated by the stop 39 in FIG. 3. However, the stops of the invention can also be installed in a relatively straight run of pipe, such as the stop illustrated as 40 in FIG. 3. In the example illustrated as 39, the water stop is inserted at a point in the overall piping system where there is likely to be no relative movement between the inner carrier pipe 17, inner insulating layer 19 and outer protective jacket 21, even if disbondment of the insulating foam were to occur. Such locations include, for example, an expansion loop, such as the loop shown in FIG. 3. Then, even if foam disbondment or some other failure had occurred in the piping system upstream or downstream, the expansion loop would act to absorb such force. The water stop 39 would act to compliment these actions in isolating any water damage which might occur.

However, because the water stops of the invention are not welded or otherwise permanently fixed to the inner pipe, they can be located in other locations than at loops or expansion joints. As will be apparent from the discussion which follows, even if relative movement were to occur between the inner pipe and outer insulating layer, the water stop of the invention will not adversely affect the system since it is not welded or fixedly attached to the inner pipe in a rigid manner and thus would not move in concert with the inner pipe.

Figure 4:
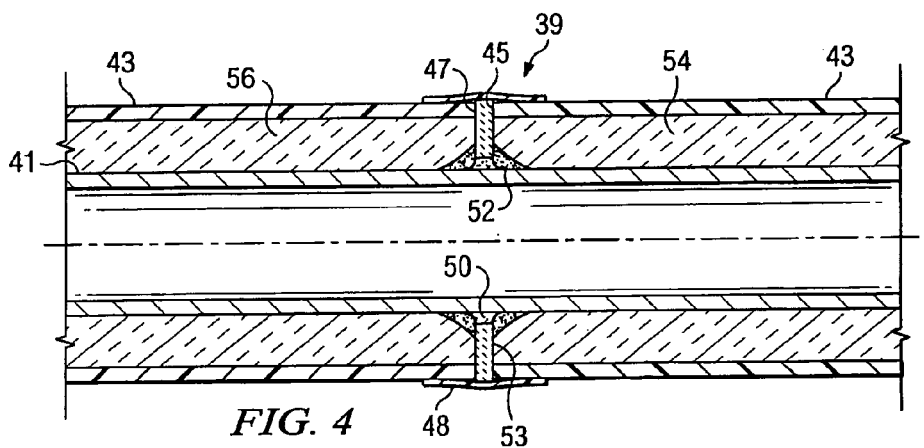
FIG. 4 is a side, cross-sectional view of the water stop of the invention.

As best seen in FIG. 4, the water stop 39 is located about an inner carrier pipe 41 which will typically be formed of steel or other metal for joining with the ends of adjacent pipe lengths in the length of the piping string. The water stop 39 can be held in place by functional engagement or can temporarily fixed to the carrier pipe 41 so that it extends radially outward toward the outer protective jacket 43. For example, in FIG. 4, the outer diameter of the stop is sandwiched between the opposing extents 45, 47 of outer protective jacket. A further protective layer, such as a layer of heat shrink plastic material 48 can be used to cover the junction of the water stop 39 and the protective jacket.

The water stop 39 thus comprises a centrally located disk 53 which surrounds the inner carrier pipe at a selected location and which extends radially outwards generally perpendicular to the pipe in a direction toward the outer jacket 43. The disk 53 is preferably about 3/16–3/8 inches thick. The outer diameter of the disk 53 is preferably about the same or slightly less than that of the outerjacket 43. The inner diameter is at least sufficient to allow the disk to be slid into position on the inner pipe. The inner diameter of the disk can also be provided with a slight lip, in some cases, to assist in the water tight sealing function. The centrally located disk is formed of a material which is impervious to the passage of water so that it forms a water stop.

Preferably, the centrally located disk is formed of a suitable synthetic, such as a suitable ceramic material, which resists the transfer of heat from the inner carrier pipe 41 outward toward the protective jacket 43. The disk can be temporarily fixed to the inner carrier pipe, for example by a suitable epoxy (illustrated in exaggerated fashion as 50 in FIG. 4), or can merely be slipped over the pipe so that a central opening in the disk is in close frictional engagement with the pipe where machining tolerances allow. In some cases, a layer of Teflon® (spray or tape) may be applied to the external surface of the inner pipe 41 to allow the disk to be more easily slid into position. The central opening in the disk can be backed up by filling in a circumferential dam region with a suitable silicone material (illustrated as 52 in FIG. 4) to further insure against leakage. The centrally located disk is positioned to form a first and second internal regions (generally at 54, 56 in. in FIG. 4) along the length of the piping so that intrusion of water into one of the regions will not be communicated to the other respective region. Preferably, the lengths of insulated piping are part of a pipeline conveying steam, hot water or other hot fluids at a temperature of about 212° F. or above.

Figure 5:
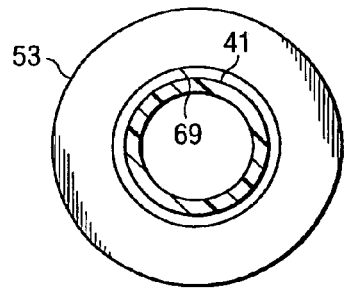
FIG. 5 is a cross-sectional view taken along lines V—V in FIG. 4.

FIG. 5 is a simplified cross-sectional view which shows a disk 53 in the form of a "donut" which is of sufficient diameter to be slipped over the inner carrier pipe 41 to the approximate position of the disk shown in FIG. 4. While the preferred material for the disk 53 is a suitable ceramic material, it will be understood that other high temperature synthetics could also be utilized, such as a suitable high temperature plastic. The main requirements are that the disk 53 can be water tight, essentially non-conductive of heat and that the disk be strong enough to withstand the forces encountered during assembly. In the embodiment of the invention shown in FIG. 5, the central opening in the disk 53 is slightly larger than the outer diameter of the inner carrier pipe 41 so that an annular region 69 is created. As has been mentioned, this annular region 69 could be filled with a sealant/adhesive composition, such as a suitable high temperature epoxy, to thereby temporarily bond the synthetic disk to the exterior of the inner steel carrier pipe. Any suitable bonding agent, glue or adhesive could be utilized. In another embodiment of the invention, the annular region 69 is machined so closely that the disk 53 is merely slipped on the carrier pipe 41 and held in place by frictional engagement with the exterior of the pipe. Also, as has been mentioned, the annular region in either situation can be backed up with an additional sealant, such as a suitable silicone (52 in FIG. 4).

The water stop 53 can be used to isolate a breach in the integrity of the outer protective jacket and insulating layers of the piping system. For example, in the case of the breach 25 in FIG. 3, the water stops 39, 40 would isolate any water or other containment intrusion to a specified length of the piping system between the water stops. Electrical resistance or other type measuring systems can be incorporated into the piping system to identify problem sections of the pipeline. Remedial action can then be taken to remedy defects in the pipeline located between a known set of water stops.

An invention has been provided with several advantages. By incorporating the water stops of the invention at regular intervals in a pre-insulated pipeline of the type under discussion, a faulty section of the pipeline can be isolated so that water or other contaminate intrusion travels only a fixed length or distance. The system incorporates several existing, commercially available materials or components, thereby simplifying manufacture and assembly. The water stop installation can be easily applied as an additional step in the overall pipeline installation, adding expense of the overall operation. Since the water stop is not permanently affixed to the carrier pipe exterior, it can be installed in straight runs of the piping or at other locations where relative movement might occur between the inner carrier pipe and the outer protective jacket. The water stop is simple in design and economical to thereby implement in a variety of pre-insulated piping installations.

While the shown has been shown in only one of its forms, it is not thus limited but is susceptible to various change and modifications without departing from the spirit thereof.

What is claimed is:

1. A bonded foam type pre-insulated piping system for conveying high temperature fluids, comprising:

a first and second length of insulated and jacketed pipe, each having a joining end to be joined to an end of the other length, each pipe length comprising an inner steel carrier pipe having an interior surface and an exterior surface, an envelope of foamed insulation surrounding the inner pipe exterior surface, and an outer protective jacket formed of a synthetic polyolefin surrounding the envelope of insulation, the joining ends of adjacent pipe lengths being welded together to form fixed joints, whereby the adjacent pipe lengths provide a continuous length of fluid conduit for conveying high temperature fluids, the envelope of foamed insulation comprising a high temperature polyisocyanurate foam;

a special water stop located at a selected location within the length of the piping system, the water stop comprising an outer protective jacket with opposing outer extents which are joined to the respective protective jackets of the respective pipe lengths being coupled thereby, the water stop also comprising a centrally located disk which surrounds the inner carrier pipe generally perpendicular thereto at a selected location and which extends radially outward toward the outer protective jacket, the centrally located disk being formed of a non-heat conductive synthetic material which is impervious to the passage of water.

2. The insulated piping system of claim 1, wherein the centrally located disk is temporarily joined to the inner steel carrier pipe by a suitable bonding agent, glue or adhesive.

3. The insulated piping system of claim 1, wherein the centrally located disk has a central opening which is sized to allow the disks to be slid into a desired position on the inner steel carrier pipe and retained in position by forces of frictional resistance.

4. The insulated piping system of claim 3, wherein the centrally located disk is formed of a ceramic material.

5. The insulated piping system of claim 1, wherein the centrally located disk is positioned to separate the interior of the piping system into a first and second internal regions which are isolated from one another so that intrusion of water into one of the regions will not be communicated to the other respective region.

6. The insulated piping system of claim 1, wherein the lengths of insulated piping are part of a pipeline conveying steam, hot water or other hot fluids at a temperature above about 212° F.

7. A method of isolating a section of bonded foam type pre-insulated piping having an outer protective jacket to contain the ingress of water or other contaminants in the case of a breach in the outer jacket, the method comprising the steps of:

providing a first and second length of insulated and jacketed pipe, each having a joining end to be joined to an end of the other length, each pipe length comprising an inner steel pipe having an interior surface and an exterior surface;

applying an envelope of foamed insulation which surrounds the inner pipes exterior surface and envelopes the inner pipes, the envelope of foamed insulation comprising a high temperature polyisocyanurate foam;

applying an outer protective jacket formed of a synthetic polyolefin which surrounds the envelope of insulation, the joining ends of adjacent pipe lengths being welded together to form fixed joints, whereby the adjacent pipe lengths provide a continuous fluid conduit for conveying high temperature fluids;

installing a special water stop at a selected location within the length of the piping system, the water stop comprising an outer protective jacket with opposing outer extents which are joined to the respective protective jackets of the respective pipe lengths being coupled thereby, the water stop also comprising a centrally located disk which surrounds the inner carrier pipe generally perpendicular thereto at a selected location and which extends radially outward toward the outer protective jacket, the centrally located disk being formed of a non-heat conductive synthetic material which is impervious to the passage of water;

wherein the centrally located disk has a central opening which is sized to allow the disk to be slid into a desired position on the inner steel carrier pipe and retained in position by forces of frictional resistance, and further wherein the disk is then backed up by filling in a circumferential dam region on either of opposite sides of the disk adjacent the exterior surface of the inner pipe with a suitable sealant/adhesive composition; and wherein the centrally located disk is positioned to separate the interior of the piping system into a first and second internal regions which are isolated from one another so that intrusion of water into one of the regions will not be communicated to the other respective region.

8. The method of claim 7, wherein the centrally located disk is temporarily joined to the inner steel carrier pipe by a suitable bonding agent, glue or adhesive.

9. The method of claim 7, wherein the lengths of insulated piping are part of a pipeline conveying steam, hot water or other hot fluids at a temperature above about 250° F.

* * * * *